(12) United States Patent
Nochimowski et al.

(10) Patent No.: US 8,732,179 B2
(45) Date of Patent: May 20, 2014

(54) METHOD FOR PROVIDING A SUGGESTED READ LIST OF DIGITAL DATA TO A HOST DEVICE

(75) Inventors: Alain Nochimowski, Tel Aviv (IL); Micha Rave, Herzliya (IL)

(73) Assignee: SanDisk IL Ltd., Kfar Saba (IL)

( * ) Notice: Subject to any disclaimer, the term of this patent is extended or adjusted under 35 U.S.C. 154(b) by 554 days.

(21) Appl. No.: 12/341,320

(22) Filed: Dec. 22, 2008

(65) Prior Publication Data
US 2010/0161633 A1    Jun. 24, 2010

(51) Int. Cl.
*G06F 7/00* (2006.01)
*G06F 17/30* (2006.01)

(52) U.S. Cl.
USPC ......................................... 707/758

(58) Field of Classification Search
None
See application file for complete search history.

(56) References Cited

U.S. PATENT DOCUMENTS

| | | | |
|---|---|---|---|
| 6,987,221 | B2 | 1/2006 | Platt |
| 7,003,642 | B2 | 2/2006 | Dawkins et al. |
| 7,096,234 | B2 | 8/2006 | Plastina et al. |
| 8,245,259 | B2 * | 8/2012 | McCoskey et al. .............. 725/91 |
| 2003/0223320 | A1 * | 12/2003 | Sugino et al. .............. 369/30.07 |
| 2005/0044349 | A1 | 2/2005 | Henry |
| 2006/0031384 | A1 | 2/2006 | Manders et al. |
| 2006/0112098 | A1 * | 5/2006 | Renshaw et al. .................. 707/7 |
| 2007/0291404 | A1 | 12/2007 | Morse et al. |
| 2008/0162358 | A1 * | 7/2008 | Patsiokas et al. ............... 705/57 |
| 2008/0189295 | A1 * | 8/2008 | Khedouri et al. ............... 707/10 |
| 2008/0222314 | A1 | 9/2008 | Matsushita et al. |
| 2008/0257134 | A1 * | 10/2008 | Oppenheimer ................. 84/609 |
| 2009/0231968 | A1 | 9/2009 | Ochi et al. |

FOREIGN PATENT DOCUMENTS

| | | |
|---|---|---|
| CN | 101300585 A | 11/2008 |
| EP | 1 953 671 | 8/2008 |
| WO | WO 2004/111882 | 12/2004 |
| WO | WO 2007/026666 | 3/2007 |
| WO | WO 2008/011549 | 1/2008 |

OTHER PUBLICATIONS

International Search Report and Written Opinion for PCT Application Serial No. PCT/IB2009/007631, dated May 12, 2010, 10 pages.
"Content Protection for Recordable Media Specification—SD Memory Card Book Common Part", *CPRM Specification, 4C Entity, LLC*, May 3, 2007, pp. ii-26.
"SD Card Specification Simplified Version of Part E1. Secure Digital Input/Output (SDIO) Card Specification", *SD Association*, Version 1.00, Oct. 2001, pp. i-23.

(Continued)

*Primary Examiner* — Rehana Perveen
*Assistant Examiner* — Raheem Hoffler
(74) *Attorney, Agent, or Firm* — Brinks Gilson & Lione

(57) ABSTRACT

The embodiments described herein generally relate to a local mass storage device that provides a suggested read list of digital data to a host device. In one embodiment, a method is provided in which a local mass storage device receives a request from a host device for a suggested read list of digital data stored in the local mass storage device. The local mass storage device creates the suggested read list and provides the suggested read list to the host device. In this embodiment, the local mass storage device is managed by the host device using a logical block addressing protocol.

16 Claims, 4 Drawing Sheets

(56) References Cited

OTHER PUBLICATIONS

"A Music Recommendation System Based on Annotations about Listeners' Preferences and Situations," Kaji et al., Proceedings of the First Int'l Conf. on Automated Production of Cross Media Content for Multi-Channel Distribution, 4 pages, 2005.

"Data Usage Profiling by Local Storage Device," U.S. Appl. No. 12/059,107, Inventors: Nochimowski et al., filed Mar. 31, 2008.

"Data Indexing by Local Storage Device," U.S. Appl. No. 12/123,304, Inventors: Nochimowski et al., filed May 19, 2008.

"Data Indexing by Local Storage Device," U.S. Appl. No. 12/123,252, Inventors: Nochimowski et al., filed May 19, 2008.

"Dual Representation of Stored Digital Content," U.S. Appl. No. 12/177,006, Inventors: Nochimowski et al., filed Jul. 21, 2008.

English Translation of Office Action for Chinese Patent Application Serial No. 200980151945.0 dated Jun. 21, 2013, 6 pages.

English Translation of Office Action for Chinese Patent Application Serial No. 200980151945.0 dated Jan. 21, 2014, 6 pages.

Office Action for European Patent Application Serial No. 09 801 251.1 dated Feb. 10, 2014, 4 pages.

\* cited by examiner

| MUSIC Content ID | Key ID | User 1 Freq. Duration | Counter 1 | User 2 Freq. Duration | Counter 2 |
|---|---|---|---|---|---|
| Song 1 | S1 | FS11  TS11 | C1 | FS12  TS12 | C2 |
| Song 2 | S2 | FS21  TS21 | | FS22  TS22 | |

| VIDEO Content ID | Key ID | User 3 Freq. Duration | Counter 3 | User 4 Freq. Duration | Counter 4 |
|---|---|---|---|---|---|
| Movie 1 | M1 | FM13  TM13 | C3 | FM14  TM14 | C4 |
| Movie 2 | M2 | FM23  TM23 | | FM24  TM24 | |

| RING TONES Content ID | Key ID | User 5 Freq. Duration | Counter 5 | User 6 Freq. Duration | Counter 6 |
|---|---|---|---|---|---|
| Ring Tone 1 | R1 | FR15  TR15 | C5 | FR16  TR16 | C6 |
| Ring Tone 2 | R2 | FR25  TR25 | | FR26  TR26 | |

Figure 3

METHOD FOR PROVIDING A SUGGESTED READ LIST OF DIGITAL DATA TO A HOST DEVICE

BACKGROUND

Many host applications (e.g., file systems, media players, photo albums, email editors, etc.) that make use of a local storage device usually comprise a "core application" that uses a legacy mass storage path to access content stored on the local storage device (e.g., to play music, view photos, edit email, etc.). In operation, a host application would access the mass storage device via a host file system, which would then manage the mass storage device via a block device driver as logical blocks through a logical block addressing (LBA) scheme (i.e., by conveying block commands (typically standardized commands such as SD or MMC commands) over a physical interface). Host applications also can use a number of "ancillary" storage services designed to ease the management of the stored content by the host application (e.g., searching, indexing, background content preparation, etc.). One such ancillary storage service that is desirable for music content consumption is play list management. In a typical experience, in response to a user request, the music player application automatically proposes one or more songs related to the song just played (e.g., same artist, same genre, same period, etc.) and/or based on knowledge of user preferences (e.g., via usage monitoring). Instead of proposing a song related to a song just played, the music player application can automatically create a play list for the user.

There are several disadvantages associated with this approach. First, this approach provides sub-optimal usage of host resources (e.g., CPU consumption and usage of the storage bus) because it requires that the host device read, interpret, and compare song properties to a set of search criteria (e.g., given artist, given genre) for the whole file library. In the case of a high-capacity storage local storage device (e.g., 8 GB and up), this process can consume significant host CPU resources. Second, this approach provides a sub-optimal processing time-impact on the user experience, as a large amount of data would be read from the local storage device and processed in the host. Also, in the case of a removable storage device that is moved from a source host to a destination host, the content stored on a removable device is typically reprocessed by the play list manager of the destination host, and the processing done on the source host (e.g., searching according to mostly-used criteria) cannot be re-used on the destination host. Similarly, the play list manager on the destination host does not have knowledge of the user preference history from the source host. Another problem for mobile host devices lies in the heterogeneity of the operating systems and platforms (e.g. Symbian, Windows Mobile, Google Android, in addition to a variety of closed, proprietary OSs etc.). Unlike the PC environment where there is only one OS (Windows), a given player including the play list management feature needs to be ported/integrated on a variety of platforms, which poses a problem of scalability.

SUMMARY

Embodiments of the present invention are defined by the claims, and nothing in this section should be taken as a limitation on those claims.

By way of introduction, the embodiments described below generally relate to a local mass storage device that provides a suggested read list of digital data to a host device. In one embodiment, a method is provided in which a local mass storage device receives a request from a host device for a suggested read list of digital data stored in the local mass storage device. The local mass storage device creates the suggested read list and provides the suggested read list to the host device. In this embodiment, the local mass storage device is managed by the host device using a logical block addressing protocol.

Other embodiments are possible, and each of the embodiments can be used alone or together in combination. Accordingly, various embodiments will now be described with reference to the attached drawings.

BRIEF DESCRIPTION OF THE DRAWINGS

FIG. 3 is a schematic view of a table of an embodiment.

DETAILED DESCRIPTION OF THE PRESENTLY PREFERRED EMBODIMENTS

The detailed description that follows describes embodiments that generally relate to a local mass storage device that provides a suggested read list of digital data to a host device. These embodiments provide several advantages over prior systems where the host device—not the local mass storage device—generates a suggested read list of digital data. First, by leveraging the processing power of the local mass storage device, the suggested read list can be created without utilizing host device resources, which is especially desirable in host devices, such as mobile phones, that have limited CPU processing power. Also, because generation of the suggested read list takes place on the same device that stores the data, information needed to create the suggested read list does not need to be transferred from the local mass storage device to the host device. Having the generation of the suggested read list take place "closer" to the stored data improves processing time. Finally, in the case of a removable mass storage device, the portable nature of the storage device can be leveraged to avoid the need for various host devices to re-perform operations, as in the prior art. Further, these embodiments can provide backwards compatibility with existing host devices.

Figure 1:
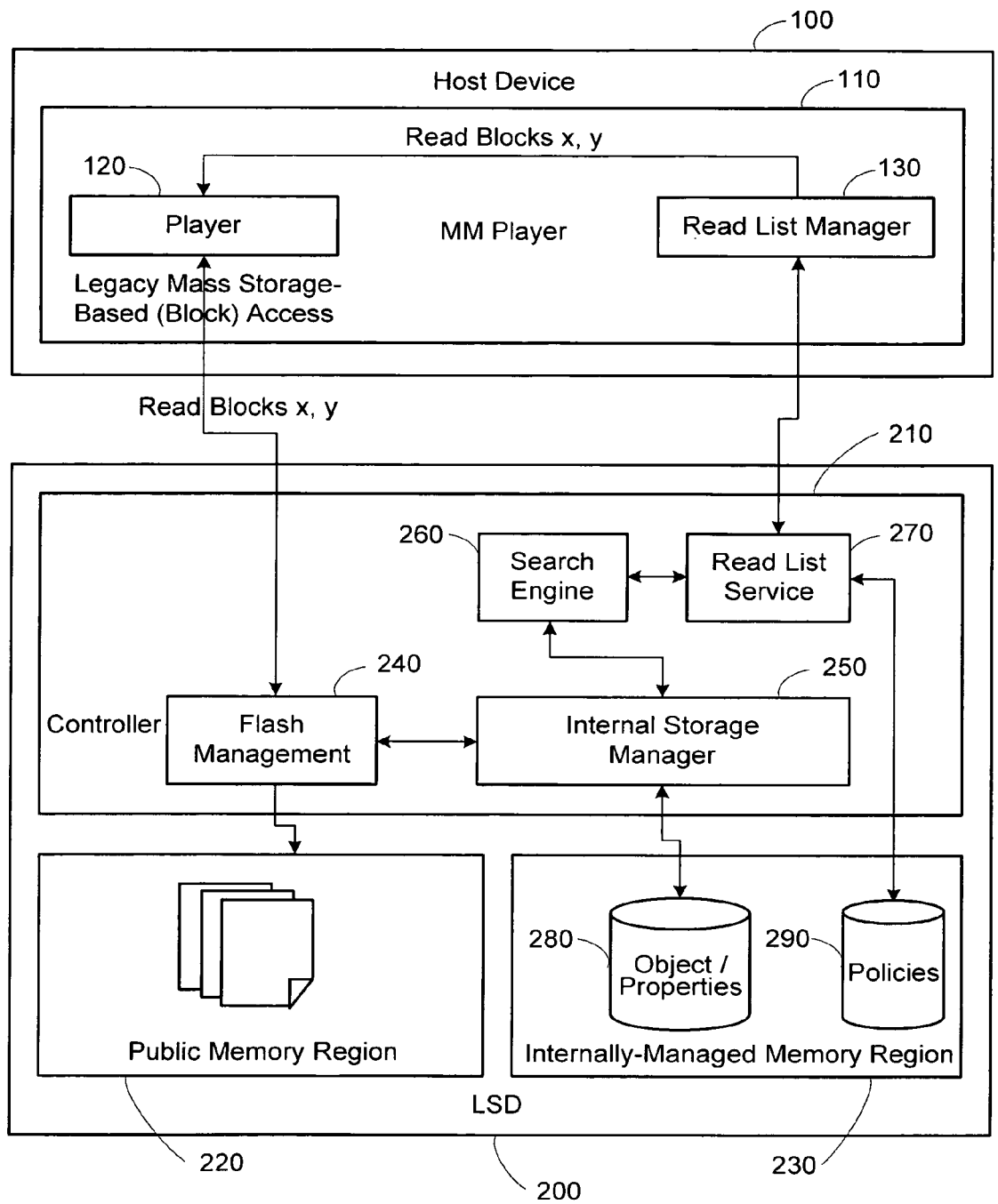
FIG. 1 is a block diagram of a host device and a local mass storage device of an embodiment.

Turning now to the drawings, FIG. 1 is a block diagram of a host device 100 in communication with a local mass storage device 200 of an embodiment. The host device 100 can take any suitable form, such as, but not limited to, a personal computer, a mobile phone, a game device, a personal digital assistant (PDA), an email/text messaging device, a digital camera, a digital media (e.g., MP3) player, a GPS navigation device, and a TV system. As shown in FIG. 1, in this embodiment, the host device 100 comprises a multimedia player (MM) 110, which contains a player 120 and a read list manager 130. As will be discussed in more detail below, these components can be used to play data stored in the local mass storage device 200. The multimedia player 110, player 120, and read list manager 130 can be implemented in hardware and/or software in the host device 100. The host device 100 can contain other components, which are not shown in FIG. 1 to simplify the drawing. For example, the multimedia player 110 can access the local mass storage device 200 via a host file system, which would then manage the local mass storage device 200 via a block device driver as logical blocks through a logical block addressing (LBA) scheme (i.e., by conveying block commands (typically standardized commands such as SD or MMC commands) over a physical interface).

The host device 100 is in communication with the local mass storage device 200 via a physical transport between corresponding input/output ports on the host device 100 and local mass storage device 200. As used herein, the phrase "in communication with" means in direct communication with or in indirect communication with via one or more components named or unnamed herein (e.g., a memory card reader). In one embodiment, the input/output ports comprises mating pins and sockets to establish an electrical and physical connection. As will be described in more detail below, although one physical transport is used to connect the host device 100 and the local mass storage device 200, multiple logical protocols can be used. For example, in one embodiment, the local mass storage device 200 is managed by the host device 100 using a logical block addressing (LBA) protocol, and a different communication protocol (e.g., an internet protocol or a proprietary protocol) is used to communicate data related to suggested read lists. This is shown in FIG. 1 by the two arrows going between the host device 100 and the local mass storage device 200.

The local mass storage device 200 can take any suitable form, such as, but not limited to, a memory card, a solid-state drive, and a universal serial bus (USB) device. The local mass storage device 200 can be a portable memory device removable from the host device 100 or can be embedded in the host device 100. As shown in FIG. 1, in this embodiment, the local mass storage device 200 comprises a controller 210, a public memory region 220, and an internally-managed memory region 230. The local mass storage device 200 can comprise additional components, which are not shown in FIG. 1 to simplify the drawing. The public memory region 220 and the internally-managed memory region 230 can be part of the same memory unit or can be different memory units. The memory can take any suitable form, such as, but not limited to, solid-state (e.g., flash) memory, optical memory, and magnetic memory. Also, the memory can be one-time programmable, few-time programmable, or many-time programmable. The public memory region 220 is managed by a file system on the host device 100, and the internally-managed memory region 230 is internally managed by the controller 210 and not by the file system on the host device 100 (in this way, the internally-managed memory region 230 is "private" since it is hidden from the host device 100).

The controller 210 on the local mass storage device 200 can be implemented in any suitable manner. For example, the controller 210 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers: ARC 625D, Atmel AT91 SAM, Microchip PIC18F26K20, and Silicon Labs C8051F320.

As shown in FIG. 1, the controller 210 in this embodiment comprises a flash management block 240 (in this example, the memory is flash, but other memories can be used), an internal storage manager 250, a search engine 260, and a read list service block 270. The player 120 in the host device 100 communicates with the local mass storage device 200 using a legacy logical transport (mass storage based (block) access) through a file system on host device 100 that manages the local mass storage device 200 using a logical block addressing protocol. The flash management block 240, which can be firmware on the controller 210, translates logical addresses provided by the host device 100 to physical addresses of the public memory region 220. In addition to address translation, the flash management block 240 can perform wear leveling and other tasks to manage the physical memory. In this way, the flash management block 240 hides the complexity of the physical memory array from the host device 100.

The flash management block 240 reads and writes blocks of data as instructed by the host device 100 but does not know how these blocks relate to objects or files stored in the local mass storage device 220. To provide the local mass storage device 220 with object knowledge of the data stored in the public memory region 220, the internal storage manager 250 communicates with the flash management block 240 to access the public memory region 220, read the data and associated properties stored therein, and (optionally to improve efficiency) build a repository 280 associating blocks with objects and objects with properties. While FIG. 1 shows this repository 280 being stored in the internally-managed memory region 230, this repository 280 can be stored in the public memory region 220. The search engine 260 can be used to query the repository 280 of object/properties through the internal storage manager 250 to find particular objects/properties that fit a search criteria.

As used herein, "properties" include any information associated with an object. Examples of properties include, but are not limited to, artist name, song title, album title, genre, time length of song, composer name, year of publication, etc. Property information can include metadata stored as part of the data itself (e.g., in the header of a file) or separately from the data (e.g., in a separate file or as separate tags). The internal storage manager 250 can build/update the repository 280 at any suitable time and in any suitable manner. For example, the internal storage manager 250 can work automatically in the background (e.g., every time there is a file entered in the public memory region 220) or on demand.

The read list service block 270 in the controller 210 provides the local mass storage device 200 with the ability to provide the host device 100 with a suggested list of data that should be read from the public memory region 220. This list will be referred to herein as a "suggested read list." A suggested read list can take any suitable form. For example, a suggested read list can be a play list of one or more digital media objects/files, such as digital audio and/or video. As another example, a suggested read list can be a list of one or more "file records," where a file is comprised of a collection of file records of a smaller granularity than a file. This can be useful in the case of a bookmark being stored in the local mass storage device 200. As another example, a suggested read list can be a list of one or more sectors that need to be read to "orient" the host device 100 to the hidden/private internally-managed memory region 230, which is a priori invisible to the host file system.

Figure 2:
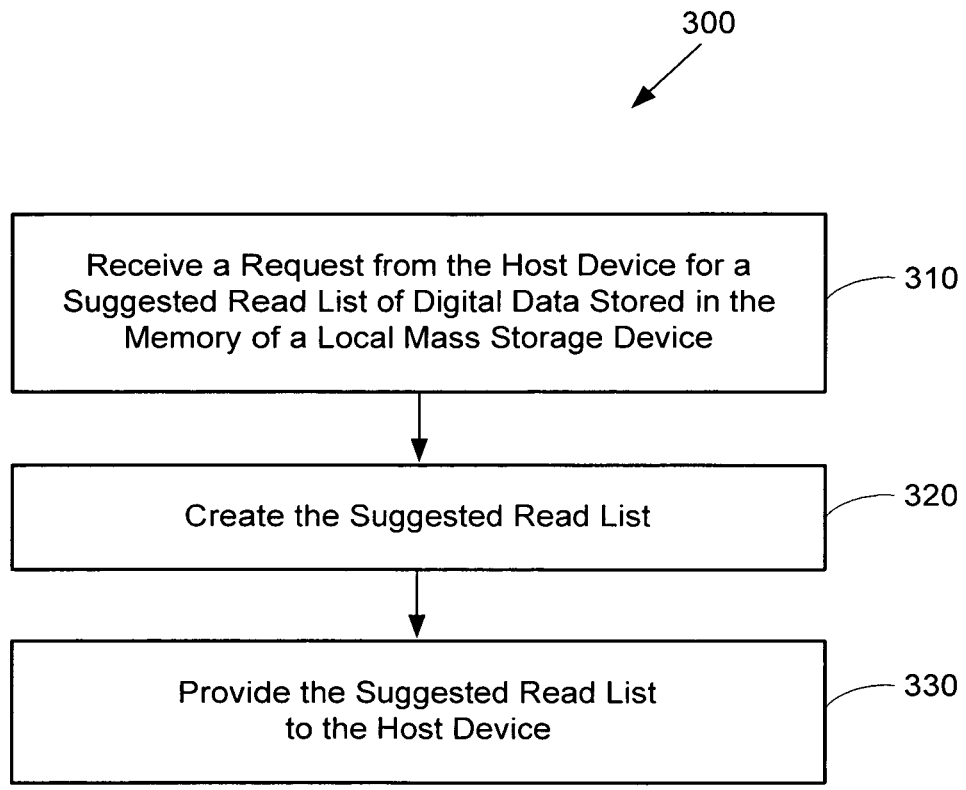
FIG. 2 is a flow chart of a method of an embodiment for providing a suggested read list of digital data to a host device.

While any type of suggested read list can be used with these embodiments, in the following example, the suggested read list takes the form of a play list. (It should be noted that a specific type of suggested read list should not be read into the claims unless explicitly recited therein.) This example will be illustrated in conjunction with the flow chart 300 in FIG. 2. (It should be noted that the acts in this method can be performed in any suitable order—not necessarily just in the order shown in the flowchart 300.) In this example, a user wishes to be provided with an automatically generated play list of one or more songs based on, for example, a song selected by the user (e.g., a last-played or currently-selected song). In prior systems, the host device would need to read the properties of all the songs stored in the local mass storage device, and the play list manager on the host device 100 would generate the play list based on these properties. However, this process can consume a large amount of host device resources, especially if there are several gigabytes of songs stored on the local mass storage device and the host device is a mobile device with a limited processor. In contrast, in this embodiment, the read list manager 130 in the host device 100 merely sends a request to the read list service 270 in the local mass storage device 200 for the read list, and the read list service 270—not the host device 100—would generate the suggested read list, as discussed below. That is, the host device 100 merely needs to indicate its desire for a suggested read list and does not even need to instruct the local mass storage device 200 on what criteria to search for in building the suggested read list.

As shown in FIG. 1, the communication between the read list manager 130 in the host device 100 and the read list service 270 in the local mass storage device 200 takes place over a different communication protocol than the logical block addressing protocol that the host device 100 uses to manage the local mass storage device 200. This allows the local mass storage device 200 to be used with conventional host devices that merely issue read/write block commands, as well as those host devices that have the functionality to outsource the creation of suggested read lists. The communication protocol between the read list manager 130 in the host device 100 and the read list service 270 in the local mass storage device 200 can take any suitable form, such as, but not limited to, an internet protocol and a proprietary protocol. (It should be noted that a read list structure can be a plain text file with a list of file names to play. If the read list structure is a plain text file, the request for the read list can be a standard file read request from the host device.)

In response to receiving the request for a suggested read list (act 310), the read list service 270 creates the suggested read list (act 320). In this example, the read list service 270 uses the search engine 260 to search the repository 280 for songs that are associated with properties that meet a certain criteria. For example, the read list service 270 can search for songs having some number of properties in common with a user-selected song (e.g., same artist, same genre, etc.). Additionally or alternatively, the read list service 270 can search for songs based on policies stored in a repository in the internally-managed memory region 230 of the local mass storage device 200. (The policies are preferably stored in the hidden, internally-managed memory region 230 to prevent tampering and provide security to this potentially-sensitive information.) As used herein, a "policy" is any information that would be useful in facilitating the creation of the suggested read list. Examples of policies include, but are not limited to, a history of played songs, already-built read lists, user preferences/profile, business policies to promote certain artists/songs, or an asynchronously-built repository of file properties. Polices can be provided with the local mass storage device 200, learned by the local mass storage device 200, and/or supplied or modified from the host device or other component external to the local mass storage device 200.

Properties and policies can be used in any desired way to create a suggested read list. For example, the read list service 270 may first generate a list of candidate songs for a play list based on the properties of the last played song and then use the policies to select songs from those candidates for the play list. As another example, the initial search of the properties repository 280 can be based on directives set forth in the policies. Irrespectively of how the properties and policies are used, it should be clear from these examples that the read list service 270 acts as a "coordinator" between the various components in the local mass storage device 200 to utilize the available resources to generate the requested suggested read list.

After the suggested read list is generated, the read list service 270 provides the suggested read list to the read list manager 130 in the host device 100 (at 330). As with the request, this information is communicated using the different protocol (e.g., IP protocol instead of LBA protocol). The suggested read list can take any suitable form and preferably specifies data locations in the public memory region 220 for the digital data in the suggested read list. That way, as shown in the simplified drawing of FIG. 1, the read list manager 130 can simply forward the specified data locations (e.g., blocks x, y) to the player 120, which can then send a read request to the local mass storage device 200 using a legacy mass storage device path. In operation, the player 120 can receive the read list in terms of "objects" (e.g., file X, file Y) and not blocks, as the player 120 sits on top of the file system, which ignores the block level and manages a higher level granularity.

As mentioned above, there are several advantages associated with these embodiments. First, because the host device 100 outsources the creation of a suggested read list, these embodiments leverage the processing power of the local mass storage device 200 to avoid monopolizing host device resources. This is especially desirable in host devices, such as mobile phones, wherein CPU processing power is limited. Also, having the local mass storage device 200 create the suggested read list avoids sending file property information to the host device 100 for analysis, thereby improving processing time. Further, because the local mass storage device 200 carries policies with it, the suggested read list can be created with the benefit of these policies, even when the local mass storage device 200 is used with different host devices. Also, because the local mass storage device 200 uses a legacy mass storage device protocol for reads and writes, the local mass storage device 200 is backwards compatible with existing host devices that are not compatible with the read list functionality described herein. An exemplary backwards compatible local storage device, which can be used to build a policy repository and facilitate an in-card search can be found in U.S. patent application Ser. No. 12/177,006, filed Jul. 21, 2008, which is hereby incorporated by reference. Also, U.S. patent application Ser. No. 12/059,107, filed Mar. 21, 2008, which is hereby incorporated by reference, describes a usage profiling technique that can be used to improve a policy repository with a user's usage preferences and history. Additionally, U.S. patent application Ser. Nos. 12/123,252 and 12/123,304, both filed May 19, 2008 and hereby incorporated by reference, describe a search indexing tool that can be used to improve the performance of a local in-card search (i.e., the background creation of a search index).

As mentioned above, a policy can be based on the usage history of a particular piece of data. The following paragraphs present an exemplary way of tracking usage history.

In one embodiment, the controller 210 has the capability of tracking data access, either by reference to a content ID of digital content or by tracking access to the keys for decrypting data files that have been encrypted. In one embodiment, the encrypted digital content may be stored in the public memory region 220 accessible without restrictions, while the keys necessary for decrypting the encrypted digital content are stored in a hidden, internally-managed memory region 230, which is accessible only to authenticated users.

In one embodiment, the keys used for encrypting and/or decrypting the encrypted data files in the memory may be generated by the local mass storage device 200. The key ID may be generated either by the local mass storage device 200 or by the host device 100. If generated by the host device 100, such key ID is then sent to the local mass storage device 200, and the controller 210 then associates such key ID with the key value that is generated by a crypto-engine in the local mass storage device 200. The key ID may be stored in the public memory region 220 while the key value is stored in the hidden internally-managed memory region 230, which is accessible only to authenticated users. Where the content accessed by the user is encrypted, the local mass storage device 200 can also store a list of users and their authentication information (e.g. password, public and/or private keys), where the users are authorized to access the encrypted content.

FIG. 3 is a schematic view of a table stored preferably in the public memory region 220. This table stores a record of data accessed by various users tracked by the controller 210. As shown in FIG. 3, data stored in the public memory region 220 can comprise various types, such as music, video and ring tones for cellular phone handsets as well as games (not shown). Thus, under the category or type music, two different songs with song IDs "song 1" and "song 2" are listed. Each of the two songs is encrypted with a corresponding key, so that the song having the ID "song 1" is encrypted and may be decrypted by a key with ID "S1." The song with ID "song 2" is encrypted and may be decrypted using a key with a key ID "S2." Each time song 1 is accessed by a particular user, the controller 210 tracks the access and increments the frequency (such as total number of accesses) of access by one. For example, if user 1 accesses song 1, the controller 210 will increment the quantity FS 11 by one. Instead of or in addition to incrementing the frequency FS11, the controller 210 may also track the duration of the access and record the duration of the access as TS 11 after user 1 accesses song 1. If song 1 is encrypted by a key with ID "S1", the controller 210 may alternatively track access to song 1 by tracking access to the key instead. If song 1 is not encrypted, the controller 210 would track access by user 1 to song 1 and increment the frequency FS11 and/or record the duration TS11 of such access. In the event that it is useful to track the access to song 1 irrespective of who is requesting the access, the controller 210 will simply add the total number of times song 1 has been accessed by different users, such as by adding FS 11 and FS 12 in the example of FIG. 3.

As is apparent from FIG. 3, the frequency and duration of accesses are associated with the type of content, such as music, video, ring tones or games. From such record, a refined user profile may be compiled or built, where the number of times and/or duration of access by each of the users to each of the songs, movies, ring tones or games can be tallied and shown as the user profile. It is also possible to obtain a higher level overview of the user profile by adding the frequency and duration for certain types of categories of digital content. For example, the controller 210 may add the total number of times that all content in the category music has been accessed by user 1 by adding FS 11 and FS 21. The same can be done for video and ring tone content (and games). Or if the advertiser or merchant is interested in total number of accesses by all users of a particular song or movie, the controller 210 may add the frequency and/or duration across all users for a particular song by adding FS 11, FS 12 and the durations TS 11 and TS 12. This can also be performed across a whole category of digital content, such as music, by all users by adding FS 11, FS 12, FS 21, FS 22 and by adding TS 11, TS 12, TS 21 and TS 22. The same can be performed for video, ring tones and games. From the above, it will be observed that the data obtained as shown in FIG. 3 would enable a wide variety of different user profiles to be compiled which can be very useful to merchants and advertisers. As mentioned above, the controller 210 can generate suggested read lists for each of the different users based on user profile of the user.

Where additional information is input to the local mass storage device 200 associated with each digital content file, or such content file contains such additional information, such as the name of the artist who either composed and/or performed the music or video, this can be stored as an attribute to the content file stored. This allows a user to search for all content files with such an attribute, or a particular title with such attribute.

Figure 4:
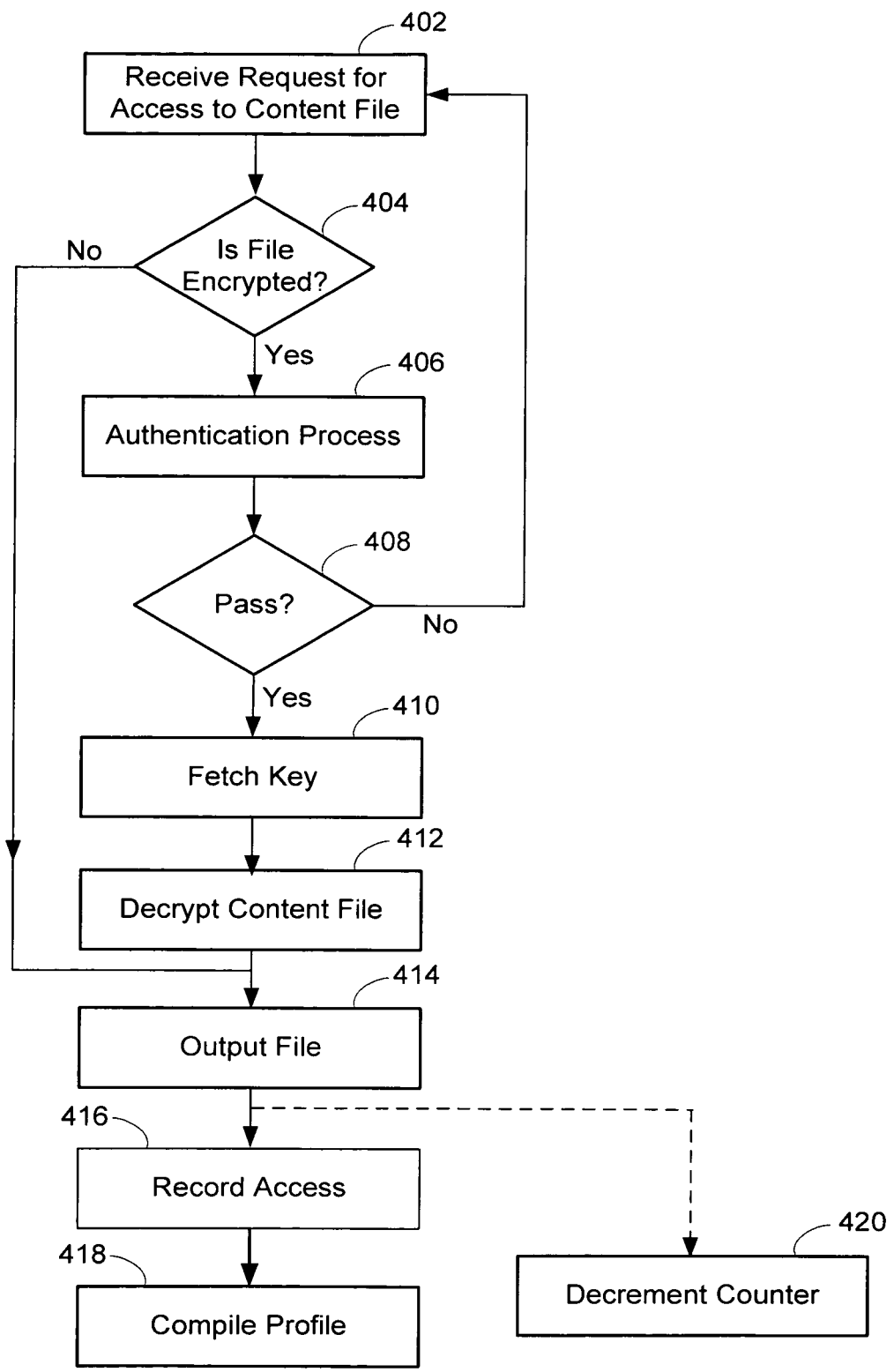
FIG. 4 is a flow chart illustrating a method for data access tracking of an embodiment.

FIG. 4 is a flow chart 400 illustrating a method for data access tracking of an embodiment. First, the controller 210 waits for a request for access to a content file from the host device 100 (act 402). If a request for access to a content file has been received, the controller 210 checks to see whether the file requested has been encrypted (act 404). If it has not been encrypted, the controller 210 proceeds to act 414. If the file is encrypted so that it is accessible only by authorized users, the controller 210 performs an authentication process (act 406). This authentication process may take the form of any one of known processes, such as the simple process where a password is requested by the controller 210 from the host device 100 and the password submitted by the host device 100 is matched by the controller 210 against passwords that are stored in the memory. Alternatively, the authentication process may be a more sophisticated one using the public key infrastructure, for example. If the user requesting access to the content file for the host device 100 is an authorized user and successfully completes the authentication process in act 406, the controller 210 then proceeds to fetch the key for decrypting the content file (act 408, 410). If the user fails the authentication process, the controller 210 returns to block 402 to check for a new request for access to content file.

Assuming that the user passes the authentication test, the controller 210 proceeds to block 412 to decrypt the content file using the key that has been fetched (act 412). The controller 210 then outputs the decrypted file and sends it to the host device 100 in the manner described above (act 414). Alternatively, the controller 210 may encrypt the decrypted file in a manner that can be read by the host device 100 before sending it to the host device 100. The controller 210 then records the access in memory, such as by incrementing the frequency of access corresponding to the content ID or key ID of the content file that has been accessed. Alternatively, instead of or in addition to incrementing the frequency of access, the duration of the access may also be recorded in the memory (act 416). Preferably, the controller 210 then compiles a user profile in the manner described above (act 418).

Instead of compiling a profile or in addition thereto, memory system 10 may also include a counter used for monitoring payment by any particular user when data stored in the memory is accessed. In one embodiment, the controller 210 stores a counter to monitor an indication of a prepaid amount by a particular user, such as in the terms of payment units. A counter can be used for each of the users, to allow each of the users to use the local mass storage device 200 as a prepaid card. Each of the users then has a prepaid number of payment units, such as C1 for user 1, C2 for user 2 and so on. Thus, the payment units are fungible and analogous to money, so that they can be used for playing or rendering different types of content, such as music, video, ring tones or games, and for different types of usage, such as playing, sending or printing.

In one implementation, after each access to a content file, one payment unit is decremented from the counter by the controller 210 (block 420 in FIG. 4). This action of decrementing may occur automatically without requiring action by the user. Preferably, decrementing is irreversible to reduce the chance of tampering and fraud. In one embodiment, different numbers of payment units may be charged for different types of content. For example, a larger number of payment units may be decremented when a movie is accessed than when a song is accessed.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for providing a suggested read list of digital data to a host device, the method comprising:
    performing by a local mass storage device in communication with a host device, wherein the local mass storage device comprises a controller and a memory storing digital data:
        receiving a request from the host device for a suggested read list of digital data stored in the memory;
        creating the suggested read list at the local mass storage device based on information regarding the digital data which is stored in the local mass storage device; and
        providing the suggested read list to the host device without transferring the information used to create the suggested read list;
    wherein the at least part of the memory of the local mass storage device is managed by the host device using a logical block addressing protocol;
    wherein a different communication protocol is used to receive the request from the host device and provide the suggested read list to the host device; and
    wherein the suggested read list specifies data locations in the memory for the digital data in the suggested read list.

2. The method of claim 1, wherein the different communication protocol is an Internet protocol.

3. The method of claim 1, wherein the read list is created based on properties associated with the stored digital data.

4. The method of claim 1, wherein the read list is created based on a set of policies.

5. The method of claim 4, wherein the memory comprises a public area managed by a file system on the host device and a private area internally managed by the local mass storage device and not by the file system on the host device, wherein the public area stores the digital data, and wherein the private area stores the set of policies.

6. The method of claim 1, wherein the suggested read list comprises a play list of digital media objects or files.

7. The method of claim 1, wherein the suggested read list comprises a list of file records.

8. The method of claim 1, wherein the suggested read list comprises a list of sectors to read.

9. A mass storage device comprising:
    an input/output port configured to connect the mass storage device with a host device;
    a memory storing digital data; and
    a controller in communication with the input/output port and the memory, wherein the controller is operative to:
        receive a request from the host device for a suggested read list of digital data stored in the memory;
        create the suggested read list at the mass storage device based on information regarding the digital data which is stored in the local mass storage device; and
        provide the suggested read list to the host device without transferring the information used to create the suggested read list;
    wherein at least part of the memory of the mass storage device is managed by the host device using a logical block addressing protocol;
    wherein a different communication protocol is used to receive the request from the host device and provide the suggested read list to the host device; and
    wherein the suggested read list specifies data locations in the memory for the digital data in the suggested read list.

10. The mass storage device of claim 9, wherein the second protocol is an internet protocol.

11. The mass storage device of claim 9, wherein the read list is created based on properties associated with the stored digital data.

12. The mass storage device of claim 9, wherein the read list is created based on a set of policies.

13. The mass storage device of claim 12, wherein the memory comprises a public area managed by a file system on the host device and a private area internally managed by the local mass storage device and not by the file system on the host device, wherein the public area stores the digital data, and wherein the private area stores the set of policies.

14. The mass storage device of claim 9, wherein the suggested read list comprises a play list of digital media objects or files.

15. The mass storage device of claim 9, wherein the suggested read list comprises a list of file records.

16. The mass storage device of claim 9, wherein the suggested read list comprises a list of sectors to read.

* * * * *

UNITED STATES PATENT AND TRADEMARK OFFICE
CERTIFICATE OF CORRECTION

PATENT NO.         : 8,732,179 B2
APPLICATION NO.    : 12/341320
DATED              : May 20, 2014
INVENTOR(S)        : Nochimowski et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 693 days.

Signed and Sealed this
Eleventh Day of August, 2015

Michelle K. Lee
*Director of the United States Patent and Trademark Office*